United States Patent [19]
Dohany

[11] 3,857,827
[45] Dec. 31, 1974

[54] METHOD OF PREPARING HIGH-QUALITY VINYLIDENE FLUORIDE POLYMER IN AQUEOUS EMULSION

[75] Inventor: Julius Eugene Dohany, Berwyn, Pa.

[73] Assignee: Pennwalt Corporation, Philadelphia, Pa.

[22] Filed: Jan. 25, 1974

[21] Appl. No.: 436,821

[52] U.S. Cl....... 260/92.1, 260/28.5 D, 260/29.6 F, 260/32.6 R, 260/80.77, 260/87.7
[51] Int. Cl............................ C08f 3/22, C08f 15/08
[58] Field of Search........... 260/87.7, 92.1 R, 80.77, 260/29.6 F

[56] References Cited
UNITED STATES PATENTS

| | | | |
|---|---|---|---|
| 3,475,396 | 10/1969 | McCain et al. | 260/92.1 R |
| 3,553,185 | 1/1971 | Amagi et al. | 260/92.1 R |
| 3,574,178 | 4/1971 | Toyoda et al. | 260/92.1 R |
| 3,781,265 | 12/1973 | Dohany | 260/92.1 R |

Primary Examiner—Harry Wong, Jr.
Attorney, Agent, or Firm—Carl A. Hechmer, Jr.

[57] ABSTRACT

Vinylidene fluoride polymers of high-quality are prepared consistently by a process of emulsion polymerization in which the chain transfer agent (acetone), initiator (diisopropylperoxydicarbonate), and monomer are fed incrementally to the aqueous reaction medium containing a fluorosurfacant.

5 Claims, No Drawings

METHOD OF PREPARING HIGH-QUALITY VINYLIDENE FLUORIDE POLYMER IN AQUEOUS EMULSION

This invention concerns a process for the preparation of thermally stable, high molecular weight vinylidene fluoride polymers in aqueous emulsion. More particularly, in the process of preparing vinylidene fluoride polymer by polymerizing vinylidene fluoride monomer (and comonomer or comonomers) in aqueous medium (in a polymerization reactor with agitation) containing a fluorosurfactant, diisopropylperoxydicarbonate as initiator, and acetone as chain transfer agent, this invention deals with the improvement in which the initiator and chain transfer agent are fed incrementally to the aqueous reaction medium simultaneously with the incremental addition of monomer, and the reaction process is continued until the desired amount of monomer is fed thereto.

The term "vinylidene fluoride polymer" used herein for brevity includes both normally solid, high molecular weight homopolymers and copolymers within its meaning. Such copolymers include those containing at least 50 mole percent of vinylidene fluoride copolymerized with at least one comonomer selected from the group consisting of tetrafluoroethylene, chlorotrifluoroethylene, trifluoroethylene, hexafluoropropene, vinyl fluoride, pentafluoropropene and ethylene. Particularly preferred are copolymers composed of from at least 70 and up to 99 mole percent vinylidene fluoride and correspondingly from 1 to 30 percent tetrafluoroethylene, such as disclosed in British Patent No. 827,308; and 70 to 99 percent vinylidene fluoride and 1 to 30 percent hexafluoropropylene, (see for example, U.S. Pat. No. 3,178,399). Terpolymers of vinylidene fluoride, hexafluoropropene and trifluoroethylene, such as described in the copending application of J. E. Dohany and A. C. Whiton, Ser. No. 174,216 filed Aug. 23, 1971, and now U.S. Pat. No. 3,790,540, are a representative class of vinylidene fluoride copolymers which can be prepared by the process embodied herein. An especially preferred class of such terpolymers are those composed of at least 60 and up to 70 mole percent vinylidene fluoride, from 2 to 5 mole percent trifluoroethylene and the balance hexafluoropropylene. Another representative group of copolymers includes the terpolymers of vinylidene fluoride, hexafluoropropene and tetrafluoroethylene such as described in U.S. Pat. No. 2,968,649.

There has recently issued a number of patents concerned with either emulsion or suspension polymerization of fluorinated ethylenes, for example, U.S. Pat. Nos. 3,437,648; 3,475,396; 3,553,185; 3,780,007; U.S. Pat. Nos. 3,574,178; 3,600,369; 3,624,064; and 3,708,463. My companion case, recently issued as U.S. Pat. No. 3,781,265, Dec. 25, 1973, discloses a process for the suspension polymerization of vinylidene fluoride yielding a bead-like polymer product in good reproducibility, i.e., having consistently high quality, for example, with regard to thermal stability, desired molecular weight range, particle size, rheological properties, proper feed and flow characteristics, and good mechanical properties. This suspension process also involves incremental addition of monomer, initiator, and acetone chain transfer agent to an aqueous medium (in this case containing a suspending agent), but also includes the incremental, simultaneous addition of trichlorotrifluoroethane, as a reaction accelerator. The process of the present invention provides a method of polymerizing vinylidene fluoride polymers in aqueous emulsion to obtain a product of similar high quality, e.g., with regard to thermal stability, desired molecular weight range, uniformity of primary latex particles or of the recovered powder from the latex, rheological properties, and excellent melt flow characteristics of a latex particle compared to a suspension polymer particle with respect to particle size and handling properties. Thus, the polymers of this invention are particularly useful for the production of smooth, tough coatings on a wide variety of substrates, particularly from aqueous dispersions. In addition, the process is so flexible in its operation that although the aqueous emulsion of the polymer produced herein may have a solids concentration as low as about 10 percent by weight, emulsions of the vinylidene fluoride polymers containing on the order of about 40 percent solids can be readily synthesized using the process.

The initial step in the polymerization technique embodied herein is to charge to the reactor the water used as the reaction medium, preferably deionized water, the amount thereof ranging from about 175 to about 900 parts by weight per 100 parts by weight of total monomer ultimately to be fed to the reactor, and preferably from about 150 to 570 parts per hundred parts of monomer. Conventional fluorosurfactant is mixed in the water in an amount within the range of about 0.05 to 0.5 percent, preferably from 0.1 to about 0.2 percent based on the weight of the total monomer ultimately charged to the reactor. Representative of fluoroalkyl surfactants suitable as vinylidene fluoride polymer emulsion stabilizers in the process of this invention are those described in U.S. Pat. No. 2,559,752, e.g., acids of the formula $X(CF_2)_nCOOH$ where n is an integer from 6 to 20, X is hydrogen or fluorine, and the alkali metal, ammonium, amine, and quaternary ammonium salts thereof; phosphoric acid esters of polyfluoroalkanols, of the formula $X(CF_2)_nCH_2OPO(OM)_2$ where X is hydrogen or fluorine, n is 5 to 10, and M is hydrogen, alkali metal, ammonium, substituted ammonium (e.g., alkyl amine of 1 to 4 carbon atoms) or quaternary ammonium; sulfuric acid esters of polyfluoroalkanols, of the formula $X(CF_2)_nCH_2OSO_3M$, where X and M are as above; the acids described in U.S. Pat. No. 3,232,970 of the formula $$CF_2Cl-\underset{\underset{CF_3}{|}}{C}F-(CF_2)_nCOOH$$

where n is an integer of 3 to 9, and the metal salts, ammonium salts, and acyl halides of said acids; the acids and salts thereof described in U.S. Pat. No. 3,311,566, and mixtures thereof, of the formula $ZC_nF_{2n}COOM$, where Z is fluorine or chlorine, n is an integer of 6 to 13, and M is hydrogen, alkali metal, ammonium, or lower alkyl substituted ammonium. The foregoing surfactants are meant to be illustrative of and not exclusive of fluoroalkyl surfactants, many others of which are known in the art and are operable as dispersion stabilizers in the emulsion preparation of vinylidene fluoride polymers.

As is usual in vinylidene fluoride polymerization, before introduction of the monomer the reactor is subjected to a series of evacuations and nitrogen purges to ensure an oxygen-free environment for the polymerization. The reactor is then heated to the desired reaction temperature. Then, optionally up to about 20 percent of the total monomer ultimately to be fed may be added to the reactor to attain the desired reaction pressure at the proposed reaction temperature before the addition and heating of the other ingredients, or in the alternative, the initial monomer charge is fed incrementally and simultaneously with the other ingredients. The process is operable at pressures of from about 300 to 1000 psig, preferably from 400 to 700 psig. The pressure is maintained for the duration of the polymerization run by the incremental monomer feed. The reaction may be pursued at the end of the run (after the total of the monomer has been fed) down to a pressure of about 150 psig. in order to increase the ultimate yield of polymer.

The initiator (diisopropylperoxydicarbonate, hereinafter referred to as "IPP") and the chain transfer agent, i.e., the molecular weight modifier (acetone), are fed incrementally or substantially continuously to the reactor together with simultaneous incremental or substantially continuous feed of the monomer, through another inlet. It is convenient to add the initiator and acetone as a mixture since the acetone advantageously serves as solvent for the relatively minor proportion of initiator involved in the reaction. More explicity, the amount of IPP used is in the range of about 0.01 to about 2.5 weight percent, preferably from 0.1 to 1 weight percent, based on the total weight of monomer ultimately fed to the polymerization reactor. In general, the initiator concentration is chosen so that it provides sufficiently high free radical concentration to promote the desired polymerization rates. The chain transfer agent, acetone, is essential to the process to regulate the molecular weight of the polymer. The acetone also is advantageously miscible with the IPP initiator and does not shorten the storage ability of the initiator solution. The proportion of acetone will range from about 0.1 to 25 wt percent, preferably 1 to 20 wt. percent, of total monomer feed. In short, the acetone provides molecular weight control of the polymer while at the same time permitting the use of adequate amounts of IPP to insure good reaction rate. If so desired, the initiator solution in acetone can be further diluted with deionized and deaerated water; about 2.5 to 10 wt. percent initiator solutions in acetone can be diluted with water up to 80 percent without phase separation; diluted initiator solutions will make process control even easier. Other solvents tried as molecular weight control agents or solvents for IPP were found unsatisfactory. For example, isopropanol is an effective chain regulator but has an adverse effect on the stability of IPP dissolved therein; methanol has no adverse effect on polymerization rate but does not effectively control the molecular weight of the polymer and also has a detrimental effect upon the stability of IPP solutions. Acetone, in contrast, is both an effective chain transfer agent and good solvent for the initiator and is not detrimental to polymerization rate or thermal stability of the polymer product.

The temperature of the polymerization reaction is critical to the success of the process. To assure optimum yields at sufficient reaction rates, the reaction temperature is maintained in the range where the initiator halflife is less than 30 minutes. Therefore, for the IPP initiated process herein described, the temperature range is from 60° to 90°C, preferably between 70° and 80°C. The temperature is conveniently controlled by expeditious feed of cooling medium to the jacket of the reactor. As stated previously, the pressure in the polymerizer during the reaction will range from 300 to 1000 psig, preferably from about 400 to 700 psig.

The monomer or mixture of monomers and the initiator solution in acetone are fed incrementally or substantially continuously to the reactor at a rate measured by the conversion of the monomer to polymer varying within the range of about 30 to 250 grams monomer converted per liter of reaction mixture per hour. The preferred reaction rates are from 60 to 150 grams/liter × hour. Total yield of polymer will generally be on the order of at least 90 to 95 percent.

Upon completion of the reaction, the residual unreacted monomer is vented, and the aqueous emulsion containing the vinylidene fluoride polymer is then recovered from the reactor; generally, this latex contains from about 10 to about 35 wt. percent polymer solids. The particle size of the polymer in the latex is in the form of small spheres in the size range of about 0.1 to about one micron, preferably from 0.2 to 0.5 micron. As mentioned previously, the process of this invention is useful for the production of vinylidene fluoride polymer latices and powders for specialty coating applications, as described in my co-pending application Ser. No. 254,520, filed May 18, 1972. When latex is the desired product, the dispersion recovered from the reactor may be further stabilized by the addition of stabilizing surfactants, preferably non-ionic surfactants based on ethoxylated phenols, ethylene oxide - propylene oxide block polymers, ethoxylated aliphatic alcohols, and other stabilizing non-ionic surfactants known to the art. Stabilized latex can be further concentrated by known techniques such as creaming or flash evaporation. With these methods, latices containing from about 40 to 60 wt. percent polymer solids can be prepared. If a dry product is desired, the reactor latex is coagulated and the recovered polymer is washed and dried in an air circulated oven. This powdery product can be used for the preparation of coatings as described in U.S. Pat. Nos. 3,211,687; 3,324,069; and 3,340,222; or for melt processing by extrusion, injection molding and compression molding.

A surprising aspect of this invention is the consistency and the high quality of polymer product, that is, the small deviation of properties in the polymer from one synthesis to the next, for a given set of polymerization variables. Furthermore, control of the process is very easy, and relatively small amounts of the expensive fluorinated surfactants are required compared to that used in processes of the prior art.

The heat stabilities of the vinylidene fluoride polymers prepared by this process may be measured by a standard oven test in which 11 grams of powdered polymer in an aluminum dish is held in an oven at 270°C for one hour, air cooled, and compared with color standards and rated as either excellent, very good, good, fair-plus, fair or poor. The molecular weights of the polymers may be gauged by determining the "plasticity number" which is an empirical index related to melt flow. The plasticity number is the area in square millimeters of a plaque made by placing 0.5 gram of polymer powder piled in a cone between the platens of a Carver press heated to 225°C. The platens are brought together to compress the powder under slight pressure (less than 50 psi) between the heated platens and the powder is preheated in this manner at 225°C for 30 seconds. A pressure of 2500 psi is then applied for 60 seconds at platen temperature of 225°C. The greater the area of the polymer plaque so produced, the lower the molecular weight of the polymer, and conversely. The vinylidene fluoride polymers prepared in accordance with this invention have plasticity numbers within the range of about 1800 to 10,000, preferably between 3,000 and 6,000. Another means of gauging molecular weight of the polymer is the measurement of the viscosity of a 10 percent and a 15 percent solution of polymer in dimethylacetamide solvent (DMAC). The apparent melt viscosity of the polymer, which property is indicative of melt processability, may be measured by the Seiglaff-McKelvey Capillary Rheometer (product of Tinius Olsen Testing Machine Company, Willow Grove, Pennsylvania) with a capillary having an L/D (i.e., length over diameter) of 26, at 375°F., 400°F. and 450°F., respectively, and 100 reciprocal seconds shear rate. The apparent melt viscosities of the vinylidene fluoride polymers produced herein range from 2,000 to 40,000 poise, preferably from about 10,000 to 30,000 poise for melt processing.

As mentioned earlier, the aqueous latices of the high molecular weight vinylidene fluoride polymers prepared as herein described, or the powdery polymer recovered from said latices and dispersed in organic solvent systems, are especially suited for the preparation of protective coatings for substrates, being easily applied by spraying, brushing or dipping. The polymers can be fabricated into various forms by shaping techniques presently practiced in the art, e.g., extrusion, injection molding or compression molding. The elastomeric gumstocks prepared by the process of this invention, i.e., those copolymers of vinylidene fluoride containing appropriate amounts of copolymerized units of the monomers hexafluoropropylene, trifluoroethylene or tetrafluoro-ethylene, may be vulcanized by conventional techniques utilized in the fluoroelastomer art to obtain high performance vulcanizates.

The examples presented below illustrate and clarify the process of the invention by demonstrating the incremental addition technique and the improved and consistent results obtained therewith. The prior art, represented for example by U.S. Pat. Nos. 3,475,396 and 3,437,648, teaches the addition of the entire amount of initiator to the reaction at the beginning of each batch cycle. Polymerization according to these known methods give reaction rate curves with a characteristic surge in the rate shortly after initiation to a very high maximum rate, which is followed by an abrupt drop in the rate protracted to the end of the run. The consistency of operations according to the prior processes is poor from batch to batch and the quality of the polymer generally unsatisfactory. In contrast, the polymerization rate of the process of this invention is controlled by the rate of initiator addition together with the chain transfer agent and additional monomer, giving a controlled and/or gradually increasing polymerization reaction rate. Consequently, under the present mode of operation the initiator concentration is initially zero and increases asymptotically, either continuously or preferably to a steady state level, until the end of the cycle. Both systems are essentially equivalent and highly reproducible and easily controlled.

EXAMPLE 1

A two-gallon, horizontal, stainless steel autoclave equipped with a paddle agitator is charged with 5035 ml. deionized water; 275 ml. of 1 percent aqueous solution of fluorosurfactant (the ammonium salts of a mixture of fluorotelomer acids $(CF_3)_2CF(CF_2CF_2)_nCF_2COOH$ where $n$ is 3 and 4, sold under the mark "PENTEL" 3138 G by Pennwalt Corporation); and 3 grams of paraffin wax having a melting point of 191°F (a conventional latex stabilizer used to aid in inhibiting coagulation and adhesion of polymer to the reactor walls, sold under the mark "Arcowax" 191 by Atlantic Richfield Co.; this wax additive is helpful, but not essential to carrying out the process of this invention).

The reactor is sealed, evacuated, purged with nitrogen, reevacuated and the vacuum broken with some vinylidene fluoride monomer to slightly above atmospheric pressure. Agitation is started, and the reactor contents are heated to 75°C and then pressurized to 650 psig by the addition of about 342 gm of vinylidene fluoride monomer, which amount is 18.75 wt. percent of the total monomer ultimately fed to the reactor. At this point, 6.5 volume percent (i.e., 11 ml) of a solution consisting of 152 gm of acetone and 14 gm diisopropylperoxydicarbonate (IPP) is added to the reactor by positive displacement pump. Initiation of the polymerization reaction occurs in about 24 minutes, signified by a 10 psig pressure drop on the pressure recorder. Continuous feeding of monomer and initiator solution is resumed, the monomer feed rate being about 393 g/hour and the rate of initiator solution injection is varied constantly over a narrow range to sustain the aforesaid monomer feed rate, that is, to maintain a fairly constant rate of polymerization as noted by pressure maintenance (ca. 650 psig) at the polymerization temperature selected, 75°C.; however, the initiator solution feed rate does approximate 32 ml. per hour.

A total of 1820 grams monomer is fed to the reactor as above-described. A total of 170 ml. of 10 wt. percent solution IPP in acetone is fed simultaneously therewith as described, i.e., equivalent to 7.7 gm. IPP per Kg monomer. The average polymerization rate is 74 g/liter × hour based on monomer feed time. The reaction is considered completed after a total time of 3.75 hours; reactor pressure is then reacted down to 480 psig. The agitation is stopped, the reactor contents cooled to 40°C., residual monomer vented, and the latex product drained from the reactor. The latex contains 23.9 percent polymer solids, a total of 1644 g. polymer equal to a yield of 90.3 percent. The vinylidene fluoride polymer thus produced, and recovered from the latex, has a plasticity number of 3275 mm². Heat stability rating is fair +. The Brookfield viscosity of a 10 percent solution of the polymer in dimethylacetamide is 66 cps with spindle No. 1 at 60 rpm.

EXAMPLE 2

The procedure of Example 1 is substantially followed except that the polymerization temperature is 85°C. and 9 g. of paraffin wax is included in the recipe. The initial monomer charge is 284 g. vinylidene fluoride, or 15.6 percent of the total monomer ultimately fed. Initiation of the reaction occurs 27 minutes after introduction of the initial IPP-acetone charge. Reaction pressure of 650 psig. is maintained by feeding 6.6 g. monomer per minute. The initiator feed is 4.94 g IPP per Kg. vinylidene fluoride monomer, fed as 112 ml. of 10 wt. percent IPP in acetone solution. Total monomer feed time is 3 hours and 14 minutes, after which the reaction pressure is reacted down to 300 psig, the agitator stopped, unreacted monomer vented, and the latex product drained. The average polymerization rate is 75 g/liter × hour based on monomer feed time.

The latex contains 25.2 percent polymer solids (yield = 97.4 percent). Plasticity number of the polymer is 4375 mm$^2$, and the Brookfield viscosity of a 10 percent solution thereof in dimethylacetamide is 36.7 cps. with spindle No. 1 at 60 rpm. Heat stability rating is fair.

EXAMPLE 3

The autoclave described in Example 1 is charged with 4123 ml deionized water and 277 ml of a 1 percent solution of the fluorosurfactant. The reactor is sealed, evacuated, purged with nitrogen, evacuated again, and then the vacuum is broken with a monomers mixture composed of 73 wt. percent vinylidene fluoride and 27 wt. percent tetrafluoroethylene. The reactor contents are heated to 75°C and then pressurized with 290 gm of said vinylidene fluoride/tetrafluoroethylene mixture, which causes the pressure to rise to 400 psig. (The initial monomer charge is 10.5 wt. percent of the entire monomer charge ultimately fed.) At this point the pumping of a 5 wt. percent IPP solution in acetone is started at the rate of 100 ml per hour. Initiation of reaction occurs in 8 minutes, and while then maintaining the temperature and pressure, the pumping rate of the initiator solution is so controlled that about 12 gm comonomer per minute is fed, corresponding to a polymerization rate of about 160 gm per liter × hour. The total reaction time is 3 hours and 10 minutes. The reaction consumes 70.3 ml IPP solution, equivalent to 1.02 gm IPP per Kg monomer. The recovered latex product contains 37 percent solids. The polymer yield is 90.8 percent of the 2770 gm monomers mixture fed. Plasticity number of the polymer is 2825 mm$^2$ and solution viscosity of a 15 percent solution in DMAC is 91.4 cps with spindle No. 1 at 60 rpm. The copolymer is composed of polymerized units of 70.3 wt. percent vinylidene fluoride and 29.7 wt. percent tetrafluoroethylene as determined by mass balance and GLC analysis of the initial and final gas mixtures.

EXAMPLE 4

The reactor is charged with 5035 ml. deionized water, 3 gm. paraffin wax, and 275 ml. of a 1 percent aqueous solution of fluorosurfactant. The reactor is sealed and evacuated, flushed with nitrogen, reevacuated, and then the vacuum is broken with a monomers mixture composed of 95 wt. percent vinylidene fluoride and 5 wt. percent tetrafluoroethylene. At this point agitation and heating of the reaction mixture is started, and when the desired reaction temperature of 85°C reached, the comonomer mixture is added to attain the desired pressure of 650 psig; this requires about 340 gm monomer or 18.8 percent of the total monomer feed. Then the feeding of a 5 wt. percent solution of IPP in acetone to the reactor is begun at a rate of 0.8 ml per minute. Initiation of polymerization occurs within 10 minutes, whereupon the pumping rate of the initiator solution is continued at such rate to maintain the monomer consumption rate at about 8.7 gm per minute or 98 gm per liter × hour. The reaction consumes 64 ml of 5 wt. percent IPP solution in acetone, equivalent to 1.43 gm IPP per Kg comonomer. In 2 hours and 50 minutes, the desired 1810 gm of monomer mixture has been charged. At this point, the monomer feed and initiator feed are terminated and the polymerization pressure is reacted down to 400 psig. Agitation is stopped and the reactor contents cooled to 50°C, then vented, and the latex is recovered. The latex contains 22.9 percent solids and the calculated yield of polymer is 86.8 percent of the monomer fed. Plasticity of the polymer is 2600 mm$^2$ and the solution viscosity of a 15 percent solution in DMAC is 510 cps with spindle No. 2 at 30 rpm. Heat stability rating of the polymer is fair.

EXAMPLE 5

The reactor is charged with 5035 ml. deionized water, 3 g. paraffin wax, and 275 ml. of a 1 percent aqueous solution of the fluorosurfactant of Example 1. The reactor is sealed, evacuated, purged with nitrogen, evacuated again, and then the vacuum is broken with a monomers mixture composed of 95 wt. percent vinylidene fluoride and 5 wt. percent tetrafluoroethylene. The stirred reactor contents are then heated to 85°C and at that point pressurized to 650 psig with about 300 gm of a mixture of 95 wt. percent vinylidene fluoride and 5 wt. percent tetrafluoroethylene, and 15 gm hexafluoropropene, the initial monomers charge being 16.7 percent of the total comonomers ultimately fed. Then the feeding of a 4 wt. percent IPP solution in acetone is started at the rate of about 0.5 ml. per minute. Initiation of polymerization occurs in 10 minutes whereupon the initiator solution is pumped at such a rate (ca. 0.33 ml/minute) to maintain the termonomer consumption rate at about 120 gm in 15 minute intervals. The desired 1900 gm of total monomers is fed within 3 hours and 22 minutes. The average polymerization rate is 72 gm per liter × hour. At this point monomer feed and initiator solution feed are terminated and the reaction pressure is reacted down to 300 psig. The reaction consumes 64.7 ml of 4 wt. percent IPP solution in acetone, equivalent to 1.1 gm IPP per Kg monomers mixture. The agitation is stopped, a sample taken of the residual monomers mixture, and the reactor is cooled to 40°C. Finally, the reactor is vented and the latex recovered.

The latex product contains 24.4 percent of terpolymer solids composed of polymerized units of 90.79 wt. percent vinylidene fluoride, 5.44 wt. percent tetrafluoroethylene, and 3.77 wt. percent hexafluoropropylene, as determined by mass balance and analysis of the initial and residual monomers mixtures. The yield of terpolymer is 89.8 percent. The plasticity number of the polymer is 2900 mm$^2$ and the Brookfield viscosity of a 15 percent solution thereof in dimethylacetamide is 487 cps with spindle No. 2 at 60 rpm. Heat stability rating of the polymer is fair.

EXAMPLE 6

A modified batch-process polymerization is carried out substantially in accordance with the teachings of McCain et al., U.S. Pat. No. 3,475,396 as follows:

The previously described reactor is charged with 5035 ml. deionized water, 9 g. paraffin wax and 275 ml. of a 1 percent aqueous solution of the fluorosurfactant of Example 1. The reactor is sealed, evacuated, flushed with nitrogen, reevacuated, and the vacuum broken with nitrogen. 82 g. of a 10 percent solution of IPP in acetone is added under a nitrogen blanket. Stirring of the reactor contents is begun; and the reactor is charged with 393 g. vinylidene fluoride monomer to a pressure of 650 psig while the contents are heated to 75°C. Initiation of the polymerization reaction occurs after 18 minutes. Pressure is maintained by feeding additional monomer, 400 g. the first hour, 185 g. during the second hour and 57 g. during the first half of the third hour, the total monomer fed being 1075 grams. It had been planned to feed a total of 1820 grams monomer, however, the fact that no additional monomer was required during the last half of the 3rd hour indicated that the reaction had terminated.

The agitation is stopped, the reactor cooled to 40°C, vented and the latex discharged. The product latex contains 13.5 percent vinylidene fluoride polymer solids, i.e., 836 grams of polymer, equivalent to a yield of only 77.7 percent. Heat stability rating of the polymer is poor. The plasticity number of the polymer is 9850 mm$^2$, indicating an undesirably low molecular weight. The Brookfield viscosity of a 15 percent solution of the polymer in DMAC solvent is 34.5 cps with spindle No. 2 at 60 rpm, indicating that the polymer has much lower molecular weight than the polymers of Examples 3 through 5, making the material less suitable for practical molding operations.

I claim:

1. In the process of preparing vinylidene fluoride polymer by emulsion polymerization of monomer in stirred aqueous reaction medium containing a fluoroalkyl surfactant emulsifier, the improvement which comprises feeding incrementally or substantially continuously to the reaction medium the monomer and simultaneously therewith diisopropylperoxydicarbonate and acetone, the feed rates thereof being such that the conversion of monomer to polymer is within the range of about 30 to 250 grams per liter of reaction mixture per hour, the proportions of such ingredients being within the range of about 0.01 to about 2.5 percent of diisopropylperoxydicarbonate, and about 0.1 to 25 percent of acetone, said amounts being in percent by weight based on the total amount of monomer fed to the reaction, the temperature of the polymerization being within the range of 60°C. to 90°C. and the pressure within the range of about 300° to 100° psig.

2. The process according to claim 1 wherein up to about 20 percent of the total monomer is charged to the aqueous reaction medium prior to the addition of the other said ingredients.

3. The process according to claim 1 wherein the diisopropylperoxydicarbonate is 0.1 to 1 percent and the acetone is 1 to 20 percent, based on weight of monomer feed.

4. The process according to claim 3 wherein the rate of feed is such that conversion of monomer to polymer is from 60 to 150 grams/liter per hour.

5. The process according to claim 3 wherein the polymerization temperature is in the range of 70° to 80°C and pressure is in the range of 400 to 700 psi.

* * * * *